United States Patent [19]

Schruff

[11] 4,036,098
[45] July 19, 1977

[54] FASTENING ELEMENT

[76] Inventor: Herbert Schruff, Friedrichstr. 44, 5508 Hermeskeil 3, Germany

[21] Appl. No.: 628,128

[22] Filed: Nov. 3, 1975

Related U.S. Application Data

[63] Continuation-in-part of Ser. No. 444,175, Feb. 20, 1974, abandoned.

[30] Foreign Application Priority Data

Sept. 28, 1973  Germany .............................. 2348754
May 9, 1975  Germany .............................. 2520586

[51] Int. Cl.² ............................................. F16B 13/06
[52] U.S. Cl. ...................................... 85/70; 151/41.74
[58] Field of Search ............................ 85/70, 71, 1 K; 151/41.72, 41.74

[56] References Cited

U.S. PATENT DOCUMENTS

| 2,030,167 | 2/1936 | Miller | 85/70 |
|---|---|---|---|
| 2,038,189 | 4/1936 | Morris | 85/70 X |
| 2,409,352 | 10/1946 | Gill | 85/70 |
| 2,435,144 | 1/1948 | Kubicki | 85/70 |
| 2,832,254 | 4/1958 | Viger et al. | 151/41.74 X |
| 3,128,813 | 4/1964 | Davis et al. | 85/70 |
| 3,177,916 | 4/1965 | Rosan | 151/41.74 |
| 3,365,998 | 1/1968 | Zahodiakin | 85/70 |
| 3,426,375 | 2/1969 | Jeal | 85/70 X |

FOREIGN PATENT DOCUMENTS 510,011  2/1955  Canada ..................................... 85/70

Primary Examiner—Roy D. Frazier
Assistant Examiner—Rodney H. Bonck
Attorney, Agent, or Firm—Friedman, Goodman & Teitelbaum

[57] ABSTRACT

A fastening element for fastening to a wall having an opening therethrough which is accessible only on one side of the wall, comprising a cylindrical upsettable shell having a flanged end. A cylindrical inset member having a flanged head is disposed in the shell, where the outside diameter of the head is equal to the outside diameter of the upsetting shell. Between the inset member and the upsetting shell, in an end zone adjacent the head, there is provided a material-closure, The underside of the head abuts against the shell to define a closed-linkage juncture with an adjoining face surface of the shell through direct contact. The inset member is provided with screwthreads to move the head of the inset member towards the flanged end of the shell, whereby the movement of the head upsets the shell which enlarges outwardly to define a ridge or bulge which abuts against a rear side of the wall, the bulge being larger than the opening in the wall.

6 Claims, 8 Drawing Figures

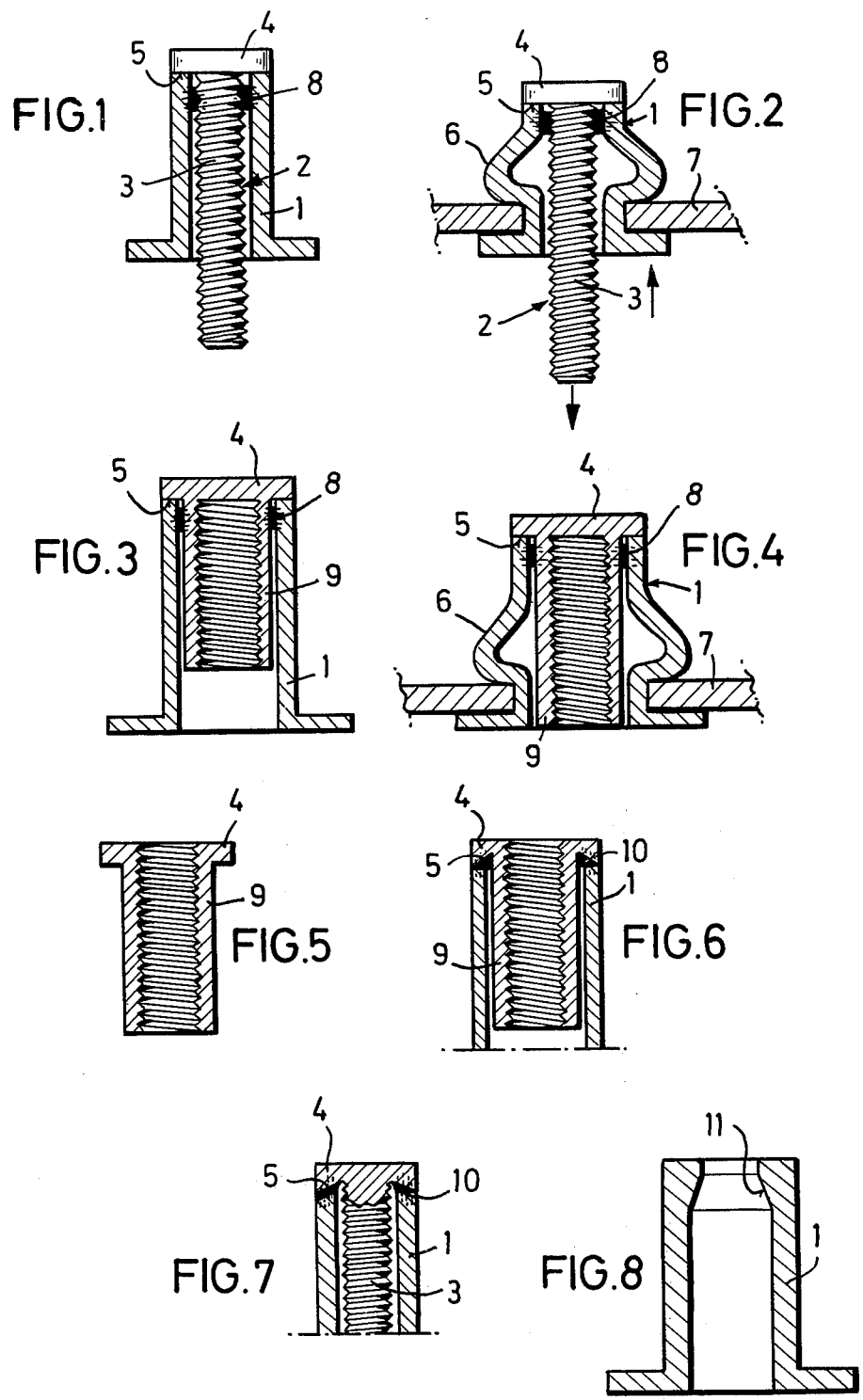

FASTENING ELEMENT

CROSS REFERENCE TO RELATED APPLICATION

The present application is a continuation-in-part application of U.S. application Ser. No. 444,175, filed Feb. 20, 1974 for SCREWTHREADED PIN now abandoned.

BACKGROUND OF THE INVENTION

The present invention relates to a fastening element for fastening to a wall having an opening therethrough which is accessible only on one side of the wall, comprising a cylindrical upsettable shell having a flanged end and a cylindrical inset member disposed in the shell.

There are already known fastening elements of the above type used at rivet joints, in which the upsettable shell is upset with the aid of a rivet bolt in such a way that it forms a bulge. The two workpieces to be riveted, lying loosely one upon the other, are enclosed between the flange of the upsettable shell and the bulge that has been formed, in fixed position. The rivet bolt, which after the riveting process no longer has any function, is thereupon cut off snugly with the flange surface, so that it now serves only as a filler pin. So that the rivet bolt cannot drop out of the rivet joint, it is often losably jointed with the upsettable shell.

In these known rivet joints, the threaded bolt is not joined with the upsetting shell in such a way, however, that it can absorb the loads raising from the forces required for the riveting process. On the contrary, in the rivet bolt there are provided desired breaking places, with which it is supposed to be assured that the bolt breaks rather than the connection or rather than have the bolt tear or the bulge yield, by any of which the rivet joint would be destroyed. At any rate, the connection between bolt and shell in the known rivet joints is not constructed in such a way that the bolt would be suited to serve as a fastening element for further construction parts.

Further, it is likewise a known practice to sink rivet sockets into a rivet bore and to upset them with the aid of a riveting tool carrying a threaded mandrel. After the upsetting, the mouthpiece of the tool carrying the threaded mandrel is then turned out of the rivet. These known rivet sockets have the disadvantage that the thread is formed in the wall of the cylindrical upsettable sleeve forming the rivet sockets. Since the shell material, in order to be upsettable, cannot be chosen too strong, the socket thread cannot absorb any high loads. These rivet sockets, therefore, are not suited for the fastening of further construction parts in any case having high loads.

Underlying the present invention is the problem of providing a fastening element of the type described above, which is suited for fastening on to the threaded bolts further construction parts, the threaded bolts being able to absorb extremely high stresses in the form of variable tensile and shearing forces, without breaking the connection between the threaded bolt and the upsettable shell.

SUMMARY OF THE INVENTION

Accordingly, it is an object of the invention to overcome the disadvantages of the prior art, which is achieved by arranging in the upsettable shell a cylindrical inset member whith a flange-type head, the outside diameter of the head being equal to the outside diameter of the upsettable shell. Between the inset member and the upsettable shell, in the end zone of the same, there is a material-closure, homogeneous connection. The underside of the head provides a closed-linkage connection with the adjoining face surface of the shell through direct contact.

Thereby, according to the present invention, there is established on the one hand, an absolute juncture between the inset member and the upsettable shell, and namely, on the circumference of the upsettable shell. This homogeneous material joining of the two parts brings it about that, with tensile and shearing forces arising in the upset state, there is preserved an absolute material closure between these two parts, so that a tearing out of the inset member from the upsettable shell, consisting of soft material and in the later screwing of further parts by turning along the inset member with respect to the shell, is impossible.

Moreover, the closed-linkage connection between the head of the inset member and the face surface of the upsettable shell brings about such a favorable distribution of forces that there takes place even a further upsetting. The limit of the force absorption is set in the element of the invention through the force-absorption capacity of a threaded bolt connected with the inset member. It has been proved that the bolt breaks rather than the absolute material closure between the upsettable shell and the inset member.

In further development of the invention, it can be advantageous if the material-closure, homogeneous juncture consists of a spot weld provided in two planes running parallel to one another. By the spot weld, there is provided an extremely simple and rapid welding process, which makes possible by the automatic welders used for it an economical manufacture of the fastening element according to the invention. In this formation according to the invention, it is not necessary, therefore, that on the entire circumference of the upsetting shell there be present a material-closure weld joint between the shell and the inset member; on the contrary, it suffices to limit this material-closure joint to several points on the circumference.

According to the invention, it can likewise be appropriate that the material-closure, homogeneous joint can be made by a butt weld between the underside of the head and the adjoining shell face surface. Since according to the invention, the outside diameter of the inset member corresponds about to the inside diameter of the shell, the inset member undergoes not only an exact guidance inside the shell, but also makes possible a secure welding of the two parts, especially by the spot welding according to the invention.

According to an advantageous development of the invention, the section of the inset member following from the head can be a bit projecting from the flanged end of the shell, the bit being provided with a continuous thread. Thereby, the inset member itself directly forms the threaded bolt. Thereby, there is yielded however, according to the invention, a threaded bolt suited especially for passage bores or openings accessible on only one side, which with the least possible production expenditure and relatively small overall dimension can be fixed securely and lastingly even on the most cramped constructions. Through the close enclosure or through the non-existant play between the shell and the threaded bolt, the penetration of aggressive substances into the interior of the shell is virtually excluded.

Further, the positioning of the threaded bolt is always exact; i.e., its emergence from the shell is dependably central, so that the precision requirements are optimally fulfilled. In consequence of the cylindrical construction of the shell, the fastening element with the same dimensions can be fixed, for example, on plates of differing thickness, since the cylindrical construction makes possible a variable clamping range up to 3 mm. Since according to the invention, the thread of the bolt runs practically up to the head, the fastening element according to the invention can be secured even in the case, for example, of extremely thin carriage plates, for example, with a thickness of 0.57 mm.

According to the invention, it can also be suitable if the section of the inset member following from the head is a hollow cylinder having an inside thread. Thereby, there is created a blind riveting-in nut, which is suited for the absorption of extremely heavy loads. The part having the thread can consist of a firm or strength-hard material, since it is not a direct component of the upsettable shell, which has to consist of relatively yielding, i.e., rivetable, material. This construction, according to the invention of a riveting-in nut, offers the further advantage that the overall construction length of the fastening element with respect to the known riveting-in nuts can be shortened, where by reason of the greater strength of the thread parts, the number of supporting thread courses can be reduced. On the other hand, since the part having the thread (the cylindrical shell) lies inside the upsetting shell and does not, as in the case of the known riveting-in nuts, lie against the upsetting zone of the shell, and since in the upsetting of the upsettable shell, the free end of the hollow cylinder having the inside thread can be drawn to the front edge of the flanged end of the upsetting shell, the construction length of the fastening element can be shortened. By reason of the construction according to the invention, therefore, there is also provided a shortening of the construction length of the upsetting range of the upsettable shell.

Especially in the case of a butt weld between the underside of the head and the adjoining shell face surface, it can be advantageous according to the invention if the underside of the head is at an acute angle with the cylindrical section ending at the head. Through this construction it is achieved that even with high pulling forces, the weld seam is not pressed out. Either the face surface of the upsetting shell can be adapted to the shape of the underside of the head or else the face surface runs at a right angle to the cylindrical section of the inset member. In the case of the butt weld, it can be of further advantage, if the upsetting shell presents in its upper section an inward-directed, surrounding thick portion. This thick portion prevents the bulge from being formed directly on the welding seam in the upsetting process, so that a breaking out of the weld seam is prevented.

In consideration of the notching effects occurring in the angular range between head and cylindrical section of the inset part to achieve a maximal strength, it is further advantageous according to the invention, if the inner circumferential surface of the head of the inset member is selected in such a way that it corresponds to one to two times the effective cross section area of the inset member. If the inset member is constructed in its cylindrical section as a threaded bolt, then the effective cross section area is that of the threaded bolt. If the inset member is constructed in its cylindrical section as a hollow cylinder with inside thread, then the effective cross section area is that of the hollow cylinder wall.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 shows a fastening element according to the invention, provided with a threaded bolt;

FIG. 2 shows a fastening element according to FIG. 1 in an upset state;

FIG. 3 shows a fastening element according to the invention, provided with a riveting-in nut;

FIG. 4 shows a fastening element according to FIG. 3 in an upset state;

FIG. 5 shows an inset member with a continuous bore constructed as a riveting-in nut;

FIG. 6 shows an inset member constructed as a riveting-in nut with an acute-angled underside head portion, joined in butt welding with the upsettable shell;

FIG. 7 shows an inset member constructed as a threaded bolt with an acute-angled underside head portion, joined in butt welding with the upsettable shell; and FIG. 8 shows an upsetting shell according to the invention, for use in butt welding.

DETAILED DESCRIPTION OF THE PREFERRED EMBODIMENTS

FIG. 1 shows a fastening element according to the invention comprising, for example, a one-piece upsettable shell 1 with a flanged end and a cylindrical inset member such as a threaded bolt or screw 2, whose shaft 3 runs through the upsettable shell 1 and projects from the flanged end thereof. The threaded bolt 2 is provided with an enlarged flanged head 4, the underside 5 of which abuts and rests on the face or end surface of the upsettable shell 1. The outside diameter of the head 4 is equal to the outside diameter of the upsettable shell 1.

In the end zone of the upsettable shell 1 adjacent to the head 4, there is provided a homogeneous joint 8 between the shell 1 and the bolt 2 to define a material-closure by welding, for example by spot welding. The inner circumferential bottom surface of the head 4, that is, the separating surface between the imagined extension of the shaft 3 through the head 4 and the remaining bottom edge of the head 4 corresponds to one to two times, preferably 1.3–1.5 times, the effective cross section area of the shaft 3.

FIG. 2 illustrates by arrows in what manner a pull force, such as by a screwthreaded device (not shown), is to be exerted on the threaded bolt 2 to achieve a bulging of, or a ridge 6 on the upsettable shell 1, where simultaneously in a direction opposite to the pull direction, a pressure is exerted on the flanged end of the upsettable shell 1, as the head 4 axially moves the opposite end of the shell 1 towards the flanged end. After the bulge or ridge 6 is formed, there is clamped in an abutting arrangement between the flanged end of the upsettable shell 1 and the formed bulge 6, for example, a sheet metal part 7 sandwiched between these two parts in such a manner that the fastening element of the present invention is unshiftably and securely seated. In the screwing on and tightening, for example, of a nut (not shown) on the threaded bolt 2, the pull is transmitted to the upsettable shell 1, already upset, and the joint becomes all the stronger as the nut is tightened. In the example represented, a pair of spot welds 8 is represented; where one spot weld is displaced through 180° with respect to the other spot weld represented.

FIG. 3 shows a fastening element which again comprises an upsettable shell, inside which there is arranged an inset member such as a hollow cylinder 9 provided with inside or internal threads. The hollow cylinder 9 is closed off on one side with an enlarged flanged head 4, which in turn, abuts and lies with its underside surface 5 on the face or surface of the upsettable shell 1. The hollow cylinder 9 provided with internal threads serves as a nut such as a riveting-in nut, into which after the upsetting process, as represented in FIG. 4, there can be screwed a threaded bolt (not shown) for the fastening of further construction parts.

Also, in this embodiment, there is again provided a material-closure, homogeneous joint between the upsettable shell 1 and the hollow cylinder 9 at an upper zone of the same adjacent to the head 4, such as by a spot weld 8. Again a pair of spot welds is shown, where one spot weld is provided 180° from the other, as mentioned above.

The length of the hollow cylinder 9 is such that in the upset state of the upsettable shell, shown in FIG. 4, the end of the hollow cylinder is snug with the front edge of the flanged end of the upsettable shell 1. Through this dimensioning there is achieved with optimal utilization of the thread carrying capacity of the hollow cylinder, a substantial shortening of the construction length of the fastening element as compared to known fastening elements. Accordingly, as shown in FIG. 3, the longitudinal length of the hollow cylinder 9 is less than the longitudinal length of the upsettable shell 1 before upsetting thereof, where the end of the hollow cylinder 9 is disposed within the upsettable shell 1, which can easily be engaged by a screwthreaded device to provide a pull force as mentioned above.

FIG. 5 shows a further possibility of construction of the hollow cylinder 9 in conjunction with a head 4. In this embodiment, the threaded bore of the hollow cylinder 9 runs through the head. Therefore, the threaded bore can receive a longer threaded bolt (not shown) through its open ends.

In FIG. 6 there is presented a partial view of a fastening element, in which the underside surface 5 of the head 4 of the hollow cylinder 9 is disposed at an acute angle with respect to the hollow cylinder body adjacent thereto. In contrast to the preceding examples, a butt weld 10 is provided between the head surface 5 and the end face surface of the upsetting shell 1, being disposed around the entire circumferential end zone of the upsettable shell.

FIG. 7 shows a partial view of the fastening element in which the threaded bolt 2 has a head 4 provided with an underside surface 5 disposed at an acute angle with respect to the shaft 3 adjacent thereto, similar to the head of FIG. 6. The end face surface of the upsettable shell 1 is inclined to adapt to the shape of the underside surface 5 of the head 4. Also in this embodiment, the head 4 is homogeneous joined with the end face surface of the upsettable shell 1 by a butt weld 10, to define a material-closure. The butt weld 10 is made through the head 4 by applying the welding device (not shown) at the upper side of the head. As mentioned above, the butt weld 10 is disposed around the entire end face surface of the upsettable shell 1.

FIG. 8 shows another form of construction of the upsettable shell 1, which is suited for use in butt welding. The upsettable shell 1 has on its upper edge on the inside portion thereof, a surrounding thick portion 11 having tapering or inclined interior walls. This thick portion 11 provides a stiffening of the wall of the upsettable shell 1, and thus prevents bulging in the immediate area of the upper edge during the upsetting process.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A fastening element adapted to be fixed in an opening in a wall which is accessible only from a front side of the wall, said element comprising a one-piece cylindrical upsettable shell, said shell being open at opposite first and second ends, said first end being provided with an outwardly extending flange, said flange being larger than the wall opening for positioning against the front side of the wall, a cylindrical inset member disposed in said shell, engagement means provided on a rear portion of said inset member for axially moving said second end of said shell together with said inset member rear portion when said inset member is axially moved within said shell, said engagement means including an enlarged flanged head provided on said inset member rear portion, said enlarged head being disposed outside said shell for abutment of an underside surface of said enlarged head against said second end of said shell to define a closed-linkage juncture therebetween, said enlarged head having an outside diameter equal in length to outside diameter of said shell, said enlarged head being smaller than the wall opening to permit insertion of both said enlarged head and associated second end of said shell through the wall opening, connecting means for preventing relative rotational movement between said enlarged head and said shell second end, said connecting means providing a material-closure, homogeneous joint, said material-closure, homogeneous joint consisting of spot welds provided in planes running parallel to one another, each of said spot welds being disposed inside said shell between an internal longitudinal surface of said second end of said shell and an external longitudinal surface of said inset member near said rear portion and spaced from said enlarged flanged head, said inset member being provided with screwthreaded means for threaded engagement with a screw-thread device for axially moving said enlarged head toward said front end of said shell, said shell including abutment-forming means disposed between said first and second ends for enlarging outwardly to define a bulge which is larger than the wall opening when said enlarged head is moved axially toward said shell second end so that said bulge abuts against a rear side of the wall, and said screwthreaded means further being adapted to receive threaded members for fastening construction parts thereto.

2. A fastening element according to claim 1, wherein the outside diameter of said inset member corresponds to the inside diameter of said shell.

3. A fastening element according to claim 1, wherein the circumferential underside surface of said enlarged head of the inset member corresponds from one to two times the effective cross section area of the cylindrical section of the inset member adjacent thereto.

4. A fastening element according to claim 1, wherein the section of said inset member following from said enlarged head is a bolt provided with continuous threads projecting from the flanged first end of said shell.

5. A fastening element according to claim 1, wherein the section of said inset member following from the enlarged head is a hollow cylinder provided with internal threads.

6. A fastening element according to claim 1, wherein said upsettable shell has a surrounding thicker portion at its second end on the inside thereof than remaining longitudinal portion extending to said flange.

* * * * *